(12) United States Patent
Ajisaka

(10) Patent No.: US 10,486,526 B2
(45) Date of Patent: Nov. 26, 2019

(54) VEHICLE CONFIGURATION

(71) Applicant: TOYOTA JIDOSHA KABUSHIKI KAISHA, Toyota-shi, Aichi-ken (JP)

(72) Inventor: Satoshi Ajisaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 15/650,477

(22) Filed: Jul. 14, 2017

(65) Prior Publication Data

US 2018/0029463 A1    Feb. 1, 2018

(30) Foreign Application Priority Data

Jul. 29, 2016    (JP) .................... 2016-150626

(51) Int. Cl.
| | |
|---|---|
| *B60K 11/04* | (2006.01) |
| *B60K 11/06* | (2006.01) |
| *B60H 1/00* | (2006.01) |
| *B60K 11/02* | (2006.01) |
| *B60L 58/24* | (2019.01) |
| *B60K 1/04* | (2019.01) |
| *H01M 10/613* | (2014.01) |
| *H01M 10/625* | (2014.01) |

(Continued)

(52) U.S. Cl.
CPC .......... *B60K 11/04* (2013.01); *B60H 1/00278* (2013.01); *B60K 11/02* (2013.01); *B60K 11/06* (2013.01); *B60K 2001/0438* (2013.01); *B60L 58/24* (2019.02); *B60L 58/26* (2019.02); *B60R 16/033* (2013.01); *H01M 10/613* (2015.04); *H01M 10/625* (2015.04); *H01M 10/6562* (2015.04); *H01M 2220/20* (2013.01)

(58) Field of Classification Search
USPC .......................................... 454/69
See application file for complete search history.

(56) References Cited

U.S. PATENT DOCUMENTS 5,392,873 A * 2/1995 Masuyama ............. B60R 16/04
                                              180/68.5
5,490,572 A * 2/1996 Tajiri ................. B60H 1/00278
                                              180/65.1

(Continued)

FOREIGN PATENT DOCUMENTS

| | | |
|---|---|---|
| CN | 1703332 A | 11/2005 |
| FR | 3063936 A1 * | 9/2018 ............ B60K 11/04 |

(Continued)

OTHER PUBLICATIONS

Dec. 11, 2018 Decision to Grant in Japanese Application No. 2016-150626.

*Primary Examiner* — Gregory L Huson
*Assistant Examiner* — Frances F. Hamilton
(74) *Attorney, Agent, or Firm* — Oliff PLC

(57) ABSTRACT

A vehicle configuration includes a motor, a battery, a cooling unit, an air conditioning unit and an air-blowing unit. The motor drives wheels of the vehicle. The battery supplies electric power to the motor. The cooling unit is equipped with a radiator that is disposed at a lower side of a floor panel of the vehicle. Heat from at least one of the motor or the battery is transferred to the radiator by circulation of a coolant. The air conditioning unit supplies cool air to an interior of a cabin of the vehicle. The air-blowing unit moves air in the cabin to the radiator.

7 Claims, 5 Drawing Sheets

(51) Int. Cl.
*B60L 58/26* (2019.01)
*H01M 10/6562* (2014.01)
*B60R 16/033* (2006.01)

(56) References Cited

U.S. PATENT DOCUMENTS

| | | | | |
|---|---|---|---|---|
| 6,357,541 | B1* | 3/2002 | Matsuda | B60K 6/22 |
| | | | | 180/68.2 |
| 6,902,020 | B2* | 6/2005 | Kronner | B60R 16/04 |
| | | | | 180/68.5 |
| 7,143,724 | B2* | 12/2006 | Hashizumi | H01M 10/486 |
| | | | | 123/41.56 |
| 7,240,752 | B2* | 7/2007 | Takahashi | B60R 16/04 |
| | | | | 180/65.1 |
| 8,297,387 | B2* | 10/2012 | Kadoi | B60H 1/00278 |
| | | | | 180/65.1 |
| 8,662,226 | B2* | 3/2014 | Varns | B60H 1/00014 |
| | | | | 180/68.5 |
| 8,820,455 | B2* | 9/2014 | Nitawaki | B60L 11/1874 |
| | | | | 180/68.5 |
| 8,843,258 | B2* | 9/2014 | Katono | B60K 1/04 |
| | | | | 701/22 |
| 9,160,042 | B2* | 10/2015 | Fujii | B60K 1/04 |
| 9,533,547 | B2* | 1/2017 | Cheng | B60K 11/04 |
| 9,861,018 | B2* | 1/2018 | Seki | B60L 1/003 |
| 2001/0040061 | A1* | 11/2001 | Matuda | B60H 1/00278 |
| | | | | 180/68.2 |
| 2006/0021805 | A1 | 2/2006 | Yamashita | |
| 2006/0269809 | A1 | 11/2006 | Sakai et al. | |
| 2008/0202741 | A1 | 8/2008 | Lee et al. | |
| 2010/0089547 | A1* | 4/2010 | King | B60L 3/0046 |
| | | | | 165/42 |
| 2011/0139397 | A1* | 6/2011 | Haussmann | B60H 1/00278 |
| | | | | 165/43 |
| 2012/0003910 | A1* | 1/2012 | Richter | B60H 1/00278 |
| | | | | 454/141 |
| 2012/0174602 | A1* | 7/2012 | Olivier | B60H 1/004 |
| | | | | 62/79 |
| 2012/0180980 | A1* | 7/2012 | Malvicino | B60H 1/00385 |
| | | | | 165/42 |
| 2013/0118820 | A1* | 5/2013 | Yokoyama | B60H 1/00385 |
| | | | | 180/65.1 |
| 2013/0206360 | A1* | 8/2013 | Zhang | B60H 1/00278 |
| | | | | 165/42 |
| 2013/0298586 | A1 | 11/2013 | Hwang et al. | |
| 2014/0216709 | A1* | 8/2014 | Smith | B60H 1/00642 |
| | | | | 165/287 |
| 2014/0311704 | A1* | 10/2014 | Yokoyama | H02K 9/19 |
| | | | | 165/41 |
| 2015/0101789 | A1* | 4/2015 | Enomoto | B60H 1/00485 |
| | | | | 165/202 |
| 2015/0340745 | A1* | 11/2015 | Inoue | H01M 10/6563 |
| | | | | 429/120 |
| 2016/0059666 | A1* | 3/2016 | Chen | F28F 9/00 |
| | | | | 62/238.7 |
| 2016/0153343 | A1* | 6/2016 | Kakehashi | B60H 1/00885 |
| | | | | 123/41.31 |
| 2016/0294026 | A1* | 10/2016 | Tsuchiya | B60K 11/06 |
| 2017/0267120 | A1* | 9/2017 | Takizawa | B60L 11/1877 |
| 2018/0056752 | A1* | 3/2018 | Ogawa | B60L 58/26 |
| 2018/0163607 | A1* | 6/2018 | Uto | B60K 11/02 |
| 2018/0222289 | A1* | 8/2018 | Kawakubo | B60H 1/00485 |

FOREIGN PATENT DOCUMENTS

| | | | | |
|---|---|---|---|---|
| JP | 2000-315513 A | | 11/2000 | |
| JP | 2006-327325 A | | 12/2006 | |
| JP | 2008055990 A | * | 3/2008 | ......... B60H 1/00278 |
| JP | 2010-274675 A | | 12/2010 | |
| JP | 2011031778 A | * | 2/2011 | ............ B60K 11/06 |
| JP | 2013-193632 A | | 9/2013 | |
| JP | 2018095127 A | * | 6/2018 | ............ B60K 11/02 |

\* cited by examiner

VEHICLE CONFIGURATION

CROSS-REFERENCE TO RELATED APPLICATION

This application claims priority under 35 USC 119 from Japanese Patent Application No. 2016-150626 filed Jul. 29, 2016, the disclosure of which is incorporated by reference herein.

BACKGROUND

Technical Field

The technology of the present disclosure relates to a vehicle configuration.

Related Art

Japanese Patent Application Laid-Open (JP-A) No. 2013-193632 discloses a configuration of a system that controls driving of an electric motor with an inverter device. In this system, a cooling fin of a radiator, which is on a circulation path of coolant that cools the motor, is disposed at a location that receives air blown by an air-blowing fan.

In the technology recited in JP-A No. 2013-193632, air blown by the air-blowing fan is simply brought into contact with the radiator. However, in a configuration in which coolant is circulated between a motor and battery or the like and a radiator, to cool the motor and battery or the like, there is scope for improvement in regard to cooling the motor and battery or the like effectively.

SUMMARY

One exemplary embodiment of the present invention provides a vehicle configuration in which a motor and battery or the like of a vehicle may be cooled effectively.

A first aspect includes: a motor that drives a wheel of a vehicle; a battery that supplies electric power to the motor; a cooling unit equipped with a radiator that is disposed at a lower side of a floor panel of the vehicle, heat from at least one of the motor or the battery being transferred to the radiator by circulation of a coolant; an air conditioning unit that supplies cool air to an interior of a cabin of the vehicle; and an air-blowing unit that moves air in the cabin to the radiator.

Heat is transferred from one or both of the motor and battery to the radiator by circulation of the coolant. The air conditioning unit supplies cool air into the cabin. Although the radiator is disposed at the lower side of the floor panel, the cool air produced by the air conditioning unit may be brought into contact with the radiator from the interior of the cabin by the air-blowing unit. Therefore, compared to a configuration in which the air-blowing unit is not present, heat may be dissipated from the radiator and the coolant cooled more effectively. As a result, the motor and battery to which the coolant is circulated from the radiator may be cooled effectively.

In a second aspect, the cooling unit of the first aspect includes: a first channel through which the coolant is circulated between the motor and the radiator; and a second channel through which the coolant is circulated between the battery and the radiator.

Because the cooling unit includes both the first channel and the second channel, the coolant may be circulated between the motor and the radiator and may be circulated between the battery and the radiator.

In a third aspect, the second aspect further includes a switching device that switches such that a flow path of the coolant is either one or both of the first channel and the second channel.

The flow path of the coolant may be switched by the switching device such that the coolant flows through one, the other or both of the first channel and the second channel. Therefore, the coolant may be circulated as appropriate and cool whichever of the motor and the battery needs cooling.

In a fourth aspect, the switching device of the third aspect includes: a first pump provided at the first channel; a second pump provided at the second channel; and a control unit that controls the first pump and the second pump.

The control unit controls both the first pump and the second pump. Thus, for example, adjustments to circulate the coolant to only one of the first channel and the second channel or to make circulation amounts of coolant different between the first channel and the second channel are easy.

In a fifth aspect, in any one of the first to fourth aspects, the floor panel includes: a low-level portion that is at a relatively low position in a vehicle vertical direction; a high-level portion that is at a rear of the vehicle relative to the low-level portion and is at a higher position than the low-level portion; and a vertical wall portion that connects between the low-level portion and the high-level portion, and the air-blowing unit includes: an opening formed in the vertical wall portion, through which air in the cabin can pass toward the radiator; and an air-blowing fan that causes air in the cabin to pass through the opening and moves the air to the radiator.

The opening is formed in the vertical wall portion connecting the low-level portion with the high-level portion. By driving of the air-blowing fan, air from the interior of the cabin may be passed through this opening and moved to the radiator effectively.

In a sixth aspect, in the fifth aspect, a blowing-out aperture is formed in the cabin of the vehicle, the blowing-out aperture blowing out air from the air conditioning unit toward the rear of the vehicle.

Air from the blowing-out aperture includes a component that is directed toward the rear of the vehicle in the cabin. Because the opening is formed in the vertical wall portion of the floor panel, the air flowing the interior of the cabin may pass through the opening and be brought into contact with the radiator effectively.

In a seventh aspect, in the sixth aspect, the battery is disposed below the low-level portion, the motor is disposed below the high-level portion, and the radiator and the air-blowing fan are disposed to the rear of the vertical wall portion.

Using the lower side of the floor panel that includes the low-level portion and the high-level portion, the battery and motor may be disposed with wasteful use of space being suppressed.

Because the radiator and the air-blowing fan are disposed to the rear of the vertical wall portion, air passing through the opening in the vertical wall portion due to driving of the air-blowing fan may be brought into contact with the radiator directly.

In an eighth aspect, in any one of the first to seventh aspects, the air-blowing fan is attached to the radiator, and the battery, the radiator and the motor are mounted to a frame member and made integral.

The battery, the radiator and the motor are made integral, and the air-blowing fan is made integral therewith by being attached to the radiator. Therefore, work of assembly to the vehicle body may be simplified compared to a configuration in which these parts are separate bodies.

According to the technology of the present disclosure, a motor and battery or the like of a vehicle may be cooled effectively.

BRIEF DESCRIPTION OF THE DRAWINGS

Exemplary embodiments of the present invention will be described in detail based on the following figures, wherein.

DETAILED DESCRIPTION

Figure 1:
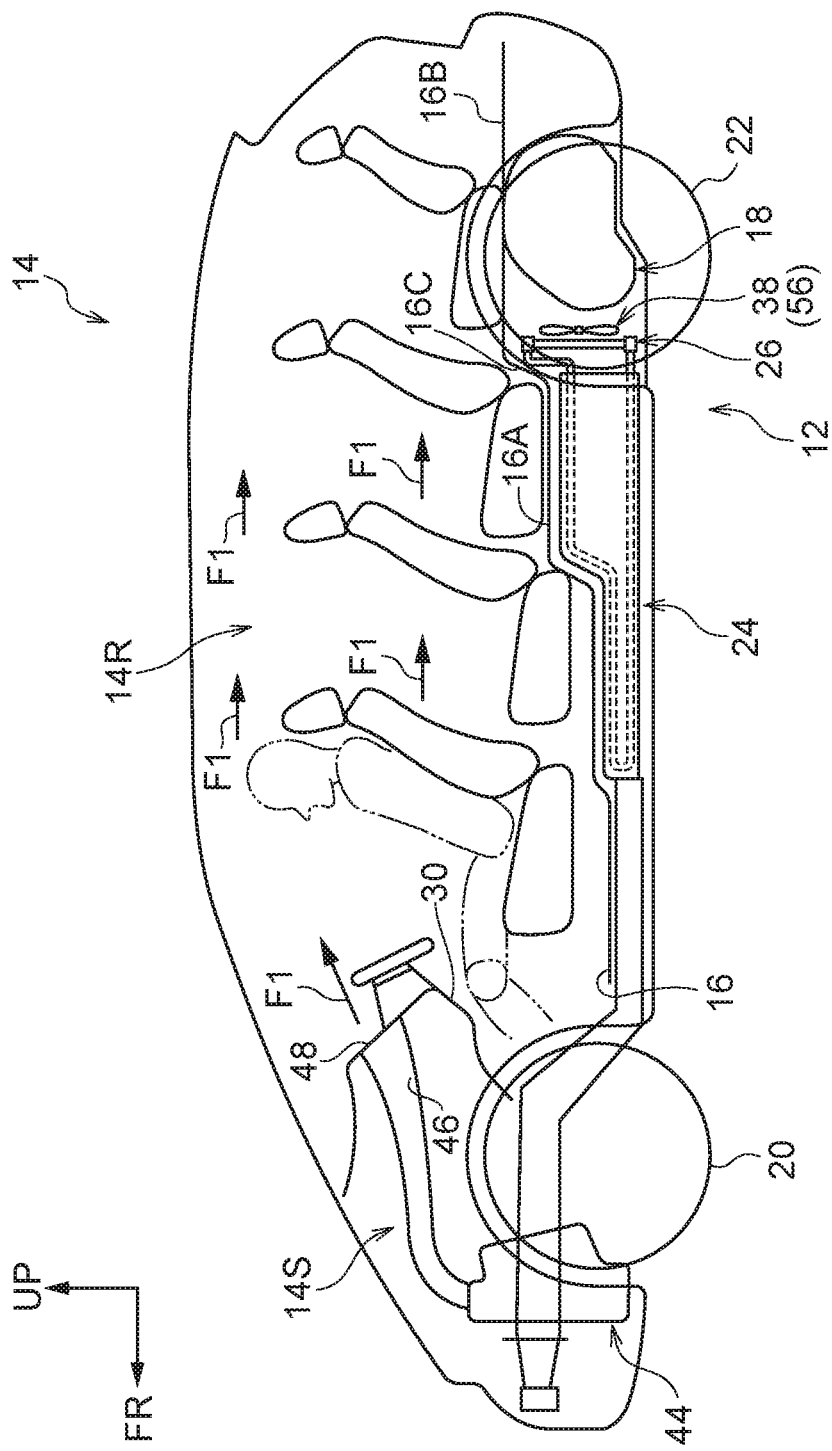
FIG. 1 is a side diagram showing a vehicle including a vehicle configuration according to a first exemplary embodiment.

A vehicle configuration according to a first exemplary embodiment of the technology of the present disclosure is described with reference to the attached drawings. In the drawings, the vehicle front is indicated by arrow FR, the vehicle width direction right side is indicated by arrow RH, and the vehicle upper side is indicated by arrow UP.

Figure 2:
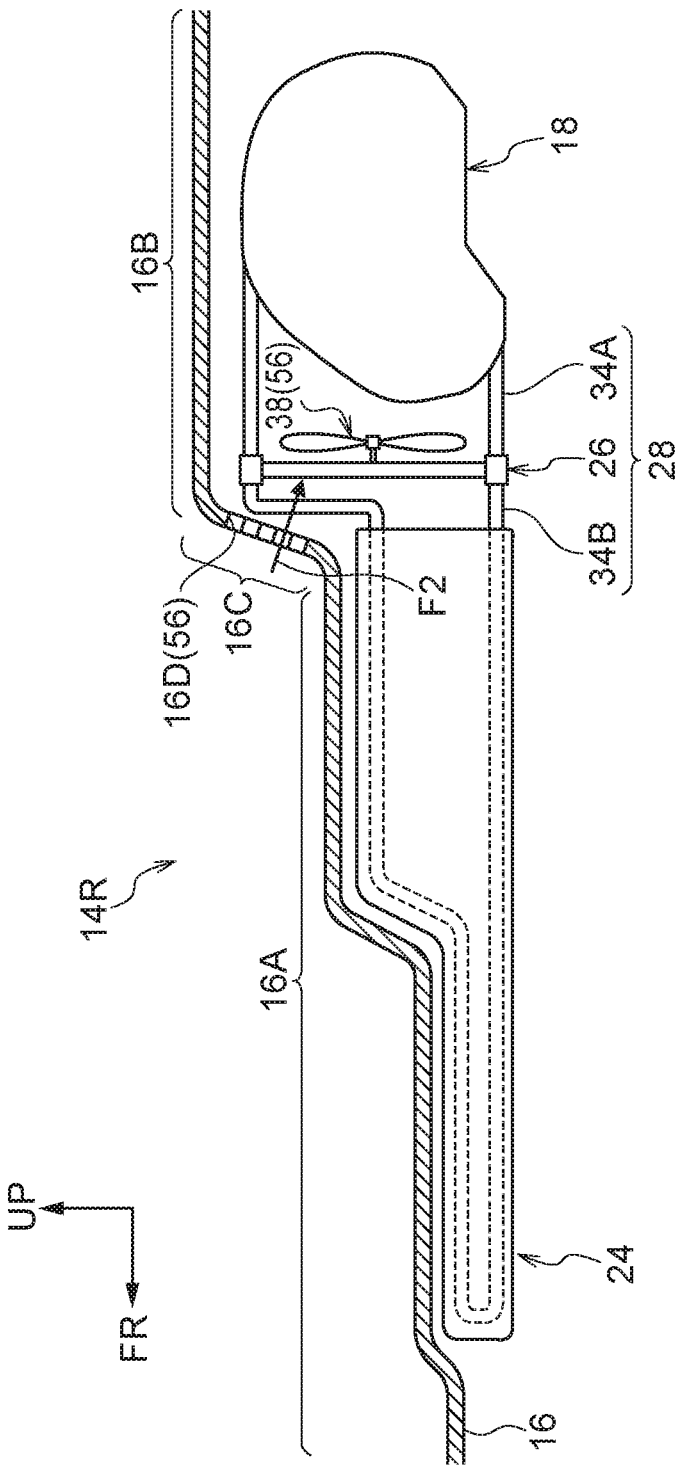
FIG. 2 is a side diagram showing a partial magnification of the vehicle configuration according to the first exemplary embodiment.

As shown in the example in FIG. 1 and FIG. 2, a vehicle 14 that is provided with a vehicle configuration 12 includes a floor panel 16. The floor panel 16 according to the present exemplary embodiment includes a low-level portion 16A, a high-level portion 16B and a vertical wall portion 16C.

The low-level portion 16A is a substantially horizontal region disposed between front wheels 20 and rear wheels 22. The high-level portion 16B is a substantially horizontal region disposed to the rear side of the vehicle relative to the low-level portion 16A. The low-level portion 16A is at a relatively low position compared to the high-level portion 16B. In the example shown in FIG. 1 and FIG. 2, the low-level portion 16A of the floor panel 16 further includes a region at an even lower position at the front side of the vehicle.

The vertical wall portion 16C is a region that is continuous with the low-level portion 16A and the high-level portion 16B, and that is inclined relative to the horizontal direction or is in a vertical direction.

An opening 16D is formed in the vertical wall portion 16C. The opening 16D penetrates through the floor panel 16 in the thickness direction thereof. The opening 16D allows air at an interior of a cabin 14R to pass out of the cabin 14R, and more specifically to pass toward a radiator 26, which is described below.

The vehicle 14 includes a motor 18, a battery 24 and the radiator 26. The motor 18 is mounted below the high-level portion 16B of the floor panel 16 in a vicinity of the rear wheels 22. The battery 24 is mounted below the low-level portion 16A of the floor panel 16, between the front wheels 20 and the rear wheels 22. The motor 18 is driven by receiving electric power supplied from the battery 24. The vehicle 14 runs by driving force of the motor 18 being transmitted to the rear wheels 22. Thus, because the vehicle 14 is run by driving force from the motor 18, there is no need to install an engine. A hybrid vehicle is also possible in which, in a vehicle in which an engine is installed, driving force from the motor and driving force from the engine may be switched between and used as appropriate. The motor 18 may also be, for example, motors that are provided at each of the rear wheels 22 (in-wheel motors).

The radiator 26 is mounted to the rear of the vehicle relative to the vertical wall portion 16C of the floor panel 16, but to the vehicle front relative to the motor 18.

Figure 4:
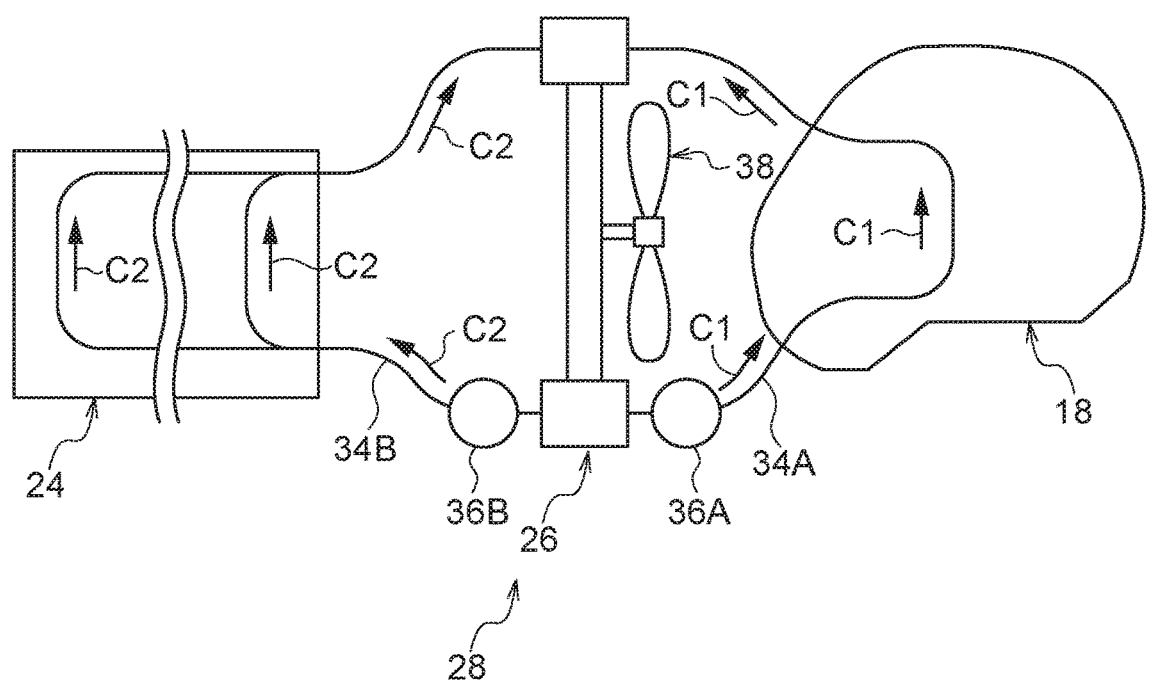
FIG. 4 is a descriptive diagram showing flows of a coolant in the vehicle configuration according to the first exemplary embodiment.

As shown in the example in FIG. 2 and FIG. 4, a first channel 34A is provided between the radiator 26 and the motor 18. Coolant is circulated between the radiator 26 and the motor 18 by the first channel 34A. Heat from the motor 18 is transferred to the radiator 26 by the circulation of the coolant. In a structure in which in-wheel motors are used as the motor 18, the first channel 34A is formed such that the coolant is circulated between the radiator 26 and each motor of the motor 18.

A second channel 34B is provided between the radiator 26 and the battery 24. Coolant is circulated between the radiator 26 and the battery 24 by the second channel 34B. Heat from the battery 24 is transferred to the radiator 26 by the circulation of the coolant.

The first channel 34A and the second channel 34B are respectively separate coolant channels. In practice, however, the two channels may be structured as a single channel (a cooling circulation path) that connects the radiator 26 with the motor 18 and the battery 24.

At the radiator 26, the coolant is cooled by heat brought by the circulation of the coolant being dissipated to the exterior. In the present exemplary embodiment, the first channel 34A and the second channel 34B are completely separate channels. However, for example, a portion of the first channel 34A and a portion of the second channel 34B may be formed as a common channel in a region close to the radiator 26.

A cooling unit 28 according to the present exemplary embodiment is a structure that is provided with the radiator 26 and includes the first channel 34A and the second channel 34B.

Because the first channel 34A and the second channel 34B are respectively separate, the coolant may be circulated through either of the first channel 34A and the second channel 34B, and the coolant may be circulated through both of the first channel 34A and the second channel 34B.

As shown in the example in FIG. 4, a first pump 36A is provided at the first channel 34A and a second pump 36B is provided at the second channel 34B.

Figure 5:
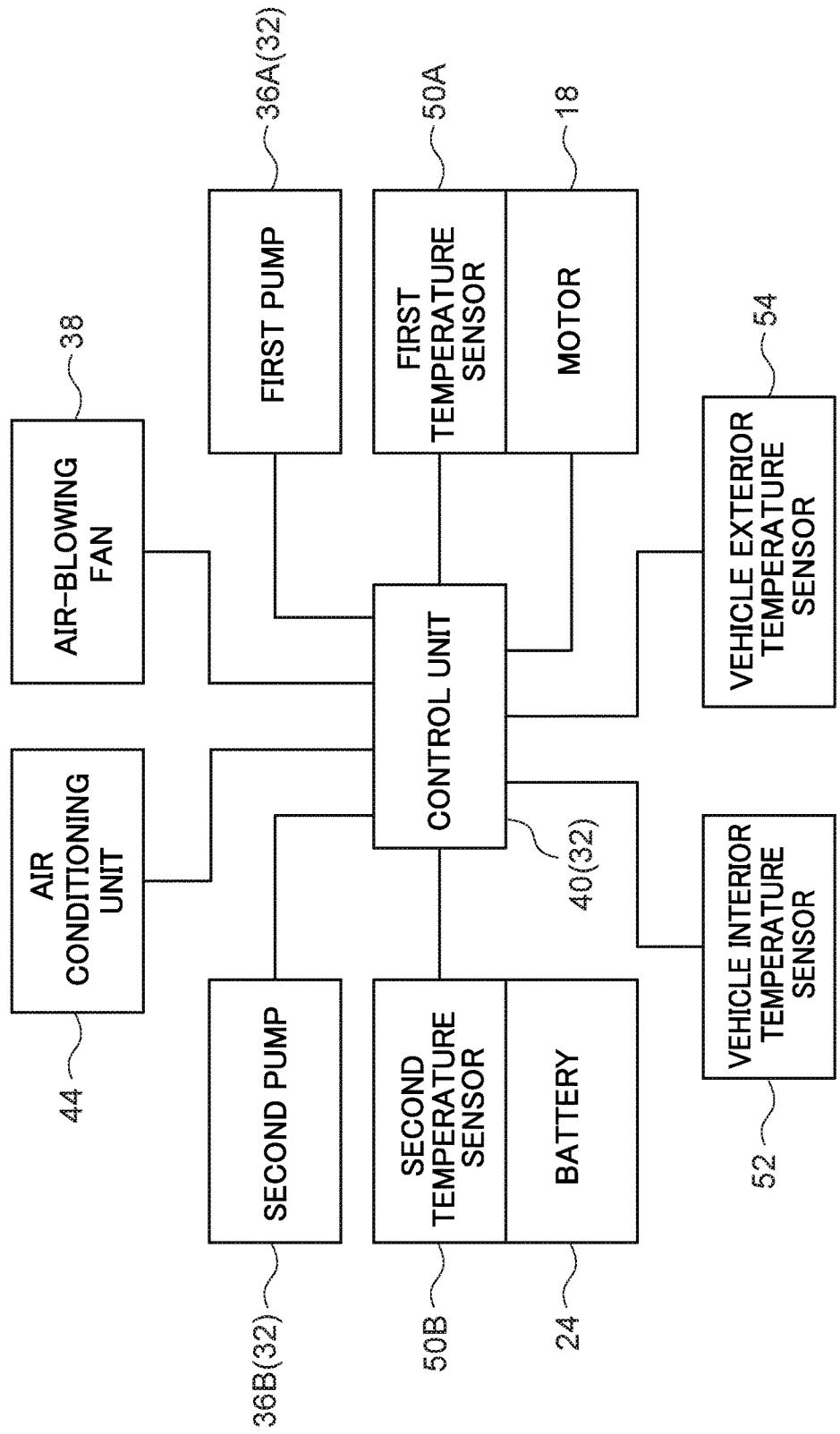
FIG. 5 is a block diagram of the vehicle configuration according to the first exemplary embodiment.

As shown in the example in FIG. 5, driving of the first pump 36A and the second pump 36B is controlled by a control unit 40. For example, the coolant may be circulated in the first channel 34A by driving of the first pump 36A, and amounts of the coolant flowing through the first channel 34A may be adjusted by adjustments of power of the first pump 36A.

Meanwhile, the coolant may be circulated in the second channel 34B by driving of the second pump 36B, and amounts of the coolant flowing through the second channel 34B may be adjusted by adjustments of power of the second pump 36B.

Moreover, the coolant may be circulated in both the first channel 34A and the second channel 34B and amounts of coolant flowing in each of the channels may be adjusted by respective driving of the first pump 36A and the second pump 36B.

Thus, in the present exemplary embodiment, a switching device 32 that switches the actual flow path of the coolant so as to be one or the other or both of the first channel 34A and the second channel 34B is a structure that includes the first pump 36A, the second pump 36B and the control unit 40.

An air-blowing fan 38 is attached to the radiator 26. As shown in the example in FIG. 5, driving of the air-blowing fan 38 is controlled by the control unit 40. In the present exemplary embodiment, an air-blowing unit 56 that moves air in the cabin 14R to the radiator 26 is a structure that includes the air-blowing fan 38 and the opening 16D.

As shown by arrow F2 in the example in FIG. 2, driving of the air-blowing fan 38 may produce a flow of air that is caused to pass through the opening 16D from the cabin 14R and is brought into contact with the radiator 26. In particular, in the present exemplary embodiment, the radiator 26 is disposed at the rear side of the vehicle relative to the vertical wall portion 16C, and the air-blowing fan 38 is disposed further to the rear side of the vehicle than the radiator 26. Because the radiator 26 is disposed on the path along which air that has passed through the opening 16D approaches the air-blowing fan 38, wind produced by the air-blowing fan 38 may be brought into contact with the radiator 26 efficiently.

Figure 3:
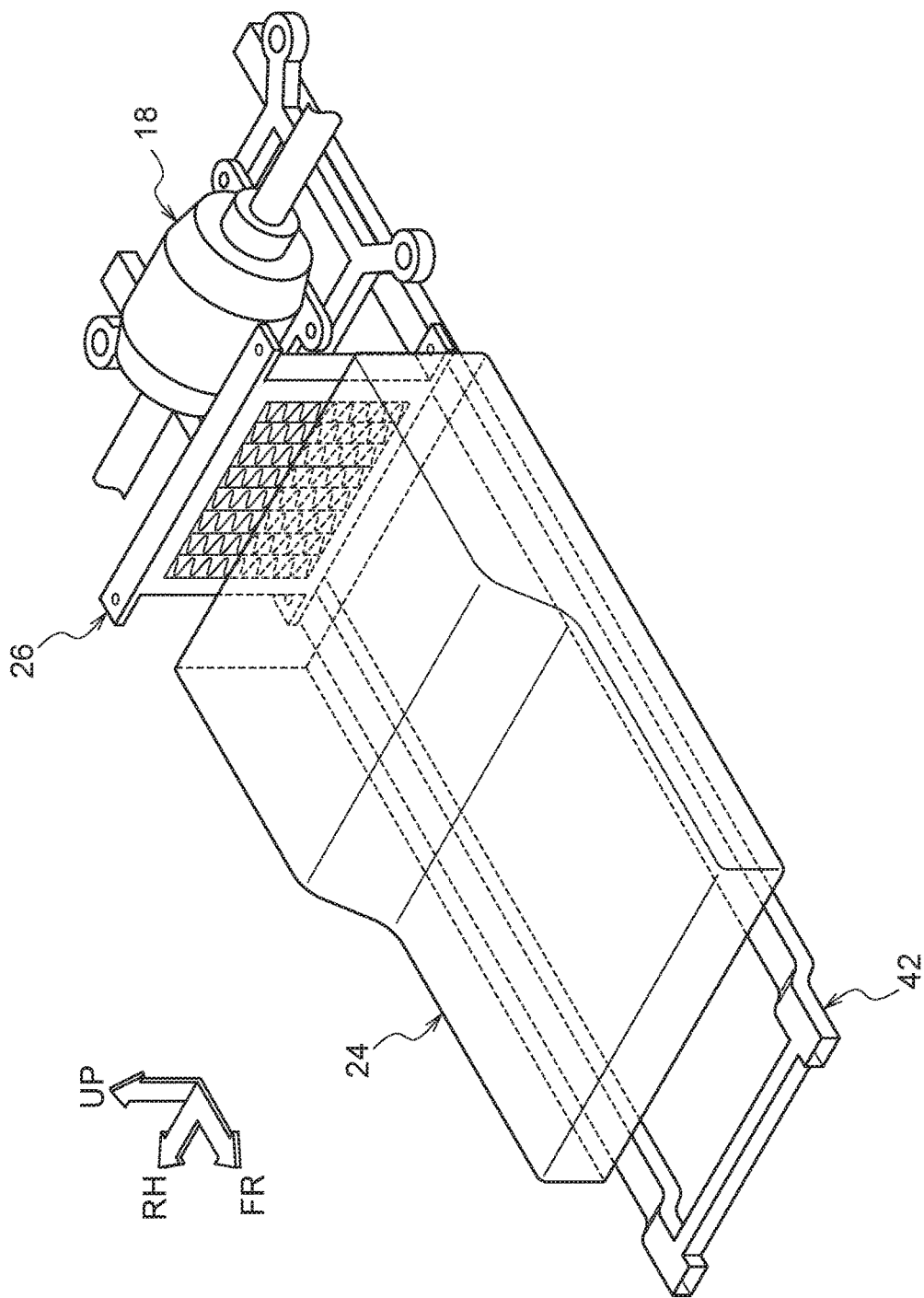
FIG. 3 is a perspective diagram partially showing the vehicle configuration according to the first exemplary embodiment.

As shown in the example in FIG. 3, in the present exemplary embodiment, the battery 24, the radiator 26 and the motor 18 are mounted to a frame member 42 and made integral. In the present exemplary embodiment, the frame member 42 is a structure that extends in a front-and-rear direction of the vehicle and is symmetrical about a center line of the vehicle 14 in the width direction of the vehicle. The battery 24, the radiator 26 and the motor 18 may be assembled to the vehicle body by the frame member 42 being attached to vehicle framework members such as, for example, a front side member, a rear side member and a cross member, or the like.

In the present exemplary embodiment, the air-blowing fan 38 is attached to the radiator 26. That is, the air-blowing fan 38 is also made integral with the battery 24 and the motor 18. The air-blowing fan 38 may be assembled to the vehicle body by the frame member 42 at which the radiator 26 is mounted being attached to the vehicle framework members.

As shown in the example in FIG. 1, a dash panel 30 is disposed at a front portion of the vehicle 14. The dash panel 30 is a member that extends in the vehicle width direction overall. The dash panel 30 is disposed at inner side the vehicle 14, between the cabin 14R and a front compartment 14S that is located at the front side relative to the cabin 14R.

An air conditioning unit 44 is disposed in the front compartment 14S. The air conditioning unit 44 takes in air from the interior of the cabin 14R or from an exterior thereof. The temperature of the air that is taken therein may be adjusted and the air may be blown out to the interior of the cabin 14R. In the present exemplary embodiment, the air conditioning unit 44 cools the air that is taken therein, and the cooled air (conditioned air) may be supplied to the interior of the cabin 14R.

A blowing-out aperture 48 is formed in the dash panel 30. Conditioned air supplied from the air conditioning unit 44 passes through a duct 46 and is blown out through the blowing-out aperture 48. The conditioned air from the air conditioning unit 44 is blown out toward the rear of the vehicle from the blowing-out aperture 48. That is, as shown by the arrows F1 in the example in FIG. 1, flows of conditioned air at the interior of the cabin 14R include a component that is directed toward the rear of the vehicle. In particular in the present exemplary embodiment, in a case in which the air conditioning unit 44 produces cool air, a cool wind is blown out from the blowing-out aperture 48 toward the rear of the vehicle.

This structure in which the blowing-out aperture 48 is formed in the dash panel 30 is not limiting. For example, structures are possible in which the conditioned air passes through ducts and is blown out toward the vehicle rear from a center console, doors, pillars or the like. In other words, it is sufficient that the blowing-out aperture 48 is formed in the cabin 14R and blows out conditioned air toward the rear of the vehicle.

As shown in the example in FIG. 5, a first temperature sensor 50A is provided at the motor 18. The first temperature sensor 50A detects temperatures of the motor 18 and sends temperature data to the control unit 40.

Similarly, a second temperature sensor 50B is provided at the battery 24. The second temperature sensor 50B detects temperatures of the battery 24 and sends temperature data to the control unit 40.

The control unit 40 controls driving of the first pump 36A, the second pump 36B and the air-blowing fan 38 on the basis of the temperature data sent from the first temperature sensor 50A and the second temperature sensor 50B.

The vehicle 14 also includes a vehicle interior temperature sensor 52 and a vehicle exterior temperature sensor 54. The vehicle interior temperature sensor 52 detects vehicle interior temperatures, which is to say temperatures of air at the interior of the cabin 14R, and sends temperature data to the control unit 40. The vehicle exterior temperature sensor 54 detects vehicle exterior temperatures, which is to say temperatures of air at an exterior of the vehicle 14, and sends temperature data to the control unit 40.

Now, operation of the present exemplary embodiment is described.

In the vehicle 14 that includes the vehicle configuration 12 according to the present exemplary embodiment, as shown by the arrows C1 in the example in FIG. 4, coolant in the first channel 34A may be circulated between the radiator 26 and the motor 18 by driving of the first pump 36A. Heat of the motor 18 may be transported to the radiator 26 by this circulation of the coolant. Thus, the motor 18 may be cooled.

Further in the vehicle 14, as shown by the arrows C2 in the example in FIG. 4, coolant in the second channel 34B may be circulated between the radiator 26 and the battery 24 by driving of the second pump 36B. Heat of the battery 24 may be transported to the radiator 26 by this circulation of the coolant. Thus, the battery 24 may be cooled.

Either one of the circulation of coolant through the first channel 34A and the circulation of coolant through the second channel 34B may be implemented, or both may be implemented at the same time. Thus, the motor 18 and the battery 24 may be respectively independently cooled.

The vehicle configuration 12 according to the present exemplary embodiment includes the air-blowing fan 38. Thus, air from the interior of the cabin 14R may be brought into contact with the radiator 26 by driving of the air-blowing fan 38. Because air from the interior of the cabin 14R, particularly the cool wind produced by the air conditioning unit 44, is brought into contact with the radiator 26, dissipation of heat from the radiator 26 may be strengthened. Thus, because an effect of cooling of the coolant by the radiator 26 is enhanced, the motor 18 and battery 24 or the like that are being cooled by the circulation of the coolant may be cooled effectively.

In practice, the following cooling method may be employed in a case in which cooling the motor 18 and the battery 24 or the like. As an example, when a temperature of the motor 18 detected by the first temperature sensor 50A exceeds, for example, a first threshold value, the control unit 40 drives the first pump 36A to cool the motor 18.

Similarly, in a case in which a temperature of the battery 24 detected by the second temperature sensor 50B exceeds, for example, a second threshold value, the control unit 40 drives the second pump 36B to cool the battery 24.

If the temperature detected by the first temperature sensor 50A or the second temperature sensor 50B does not fall even after a predetermined duration has passed, it may be necessary to further strengthen cooling of the motor 18 or the battery 24.

In this case, the control unit 40 compares a vehicle interior temperature detected by the vehicle interior temperature sensor 52 with a vehicle exterior temperature detected by the vehicle exterior temperature sensor 54. Then, if the vehicle interior temperature is lower than the vehicle exterior temperature, the control unit 40 drives the air-blowing fan 38. As a result, air in the cabin 14R that is at a lower temperature than external air is utilized, this low-temperature air is brought into contact with the radiator 26, and the cooling of the coolant by the radiator 26 may be strengthened.

On the other hand, if the vehicle interior temperature is higher than the vehicle exterior temperature, the control unit 40 drives the air conditioning unit 44 and a cool wind is produced. This cool wind is blown out through the blowing-out aperture 48 into the cabin 14R and includes a component that is oriented toward the rear of the vehicle within the cabin 14R. In this state in which the cool wind including a component that is oriented toward the rear of the vehicle is produced in the cabin 14R, the control unit 40 drives the air-blowing fan 38. As a result, the cool wind in the cabin 14R is brought into contact with the radiator 26, and the cooling of the coolant by the radiator 26 may be strengthened.

Thus, in the vehicle configuration 12 according to the present exemplary embodiment, air with a lower temperature than external air, in particular a cool wind that is produced by the air conditioning unit 44 and blown out through the blowing-out aperture 48, may be effectively utilized to strengthen the cooling of the coolant by the radiator 26. Because the cooling of the coolant by the radiator 26 is strengthened in this manner, the motor 18 and battery 24 or the like may be cooled effectively.

The floor panel 16 includes the vertical wall portion 16C. The opening 16D through which air from the interior of the cabin 14R flows toward the radiator 26 is formed in the vertical wall portion 16C. Because the cool wind that is blown out through the blowing-out aperture 48 into the cabin 14R includes a component that is oriented toward the rear of the vehicle, this cool wind may be effectively taken in through the opening 16D and brought into contact with the radiator 26. As described above, in a case in which the cool wind is produced by the air conditioning unit 44, vehicle occupants are cooled by the cool wind sent from the front side of the vehicle 14, after which the cool wind flowing toward the rear side of the vehicle 14 is drawn in to the radiator 26 effectively.

The radiator 26 is disposed to the rear side of the vehicle relative to the vertical wall portion 16C, and the air-blowing fan 38 is disposed further to rear side of the vehicle than the radiator 26. Because the radiator 26 is disposed in the path of air passing through the opening 16D toward the air-blowing fan 38, wind produced by the air-blowing fan 38 may be efficiently brought into contact with the radiator 26 from substantially directly in front of the radiator 26.

In particular, as viewed in the direction in which air coming into contact with the radiator 26 flows (the direction of arrow F2), no other parts are disposed at the upstream side of the radiator 26 to overlap with the radiator 26. Therefore, the cool wind in the cabin 14R may be directly brought into contact with the radiator 26, and the effect of cooling of the coolant by the cool wind may be enhanced.

In the vehicle configuration 12 according to the present exemplary embodiment, the battery 24, the radiator 26 and the motor 18 are mounted to the frame member 42 and made integral. Therefore, compared to a structure in which the battery, radiator and motor are separate bodies, work to assemble these units to the vehicle body is simpler and productivity of manufacture of the vehicle 14 is higher.

The vehicle configuration 12 according to the present exemplary embodiment includes the first channel 34A that circulates coolant between the radiator 26 and the motor 18 and the second channel 34B that circulates coolant between the radiator 26 and the battery 24. Even if these two channels are not provided, for example, if only the first channel 34A is present, the coolant may be circulated between the radiator 26 and the motor 18 to cool the motor 18. Similarly, if only the second channel 34B is present, the coolant may be circulated between the radiator 26 and the battery 24 to cool the battery 24. In the structure that includes both the first channel 34A and the second channel 34B, the coolant may be circulated between the radiator 26 and both the motor 18 and the battery 24. Thus, the motor 18 and battery 24 may both be cooled.

Moreover, a structure in which these two channels for coolant are provided may actually be a structure in which a single channel (a cooling circulation path) connects the radiator 26 with the motor 18 and the battery 24. Accordingly, structures for circulating coolant between the radiator 26 and the motor 18 and battery 24 may be lowered in cost and reduced in weight.

The first pump 36A is provided at the first channel 34A, and circulation of coolant in the first channel 34A may be reliably produced by driving of the first pump 36A. Furthermore, circulation amounts of the coolant in the first channel 34A may be adjusted by adjustments of power of the first pump 36A. The term "circulation amounts of coolant" used here refers to amounts of coolant circulated per unit time.

In particular, in the exemplary embodiment described above, temperatures of the motor 18 are detected by the first temperature sensor 50A, and the first pump 36A is driven on the basis of the detected temperatures. Thus, the coolant may reliably be circulated in the first channel 34A in a case in which the circulation of coolant is required.

Similarly, the second pump 36B is provided at the second channel 34B, and circulation of coolant in the second channel 34B may be reliably produced by driving of the second pump 36B. Furthermore, circulation amounts of the coolant in the second channel 34B may be adjusted by adjustments of power of the second pump 36B.

Also in particular, in the exemplary embodiment described above, temperatures of the battery 24 are detected by the second temperature sensor 50B and the second pump 36B is driven on the basis of the detected temperatures. Thus, the coolant may reliably be circulated in the second channel 34B when the circulation of coolant is required.

For example, during rapid charging of the battery 24, although the temperature of the battery 24 may rise, the temperature of the motor 18 may not rise because the motor 18 is not driven. In this case, the second pump 36B may be driven to circulate the coolant in the second channel 34B and the first pump 36A not driven. Therefore, the battery 24 may be cooled effectively while wasteful power consumption is suppressed. Alternatively, when the vehicle 14 is running with a heavy load, the temperatures of both the motor 18 and the battery 24 may rise. In this case, by both the first pump 36A and the second pump 36B being driven to cause both coolant circulation in the first channel 34A and coolant circulation in the second channel 34B, the motor 18 and the battery 24 may be cooled effectively.

Temperature rises of the motor 18 and battery 24 or the like may be detected without the use of the respective first temperature sensor 50A and second temperature sensor 50B. For example, the temperature of the motor 18 may be estimated from power consumption amounts of the motor 18, and the temperature of the battery 24 may be estimated from current amounts during charging of the battery 24.

In the exemplary embodiment described above, the switching device 32 is a structure that includes the first pump 36A, the second pump 36B and the control unit 40, in which the two pumps are controlled by the control unit 40. An alternative structure may be employed as the switching device 32. For example, in a structure in which, as mentioned above, a portion of the first channel 34A and a portion of the second channel 34B are formed as a common channel, it is sufficient for a single pump to be provided at the common portion of the channel and for a switching valve to be provided at a branching portion of the channel. Thus, by the control unit controlling the pump and the switching valve, the channel along which coolant actually flows may be switched to either one or both of the first channel 34A and the second channel 34B.

Further, coolant may be circulated in the first channel 34A even in a structure in which the first pump 36A is not present. For example, a coolant may be employed with characteristics such that the coolant is gasified by heat from the motor 18, moves to the radiator 26, is liquefied by heat dissipation at the radiator 26, and returns to the motor 18.

Similarly, coolant may be circulated in the second channel 34B even in a structure in which the second pump 36B is not present. For example, a coolant may be employed with characteristics such that the coolant is gasified by heat from the battery 24, moves to the radiator 26, is liquefied by heat dissipation at the radiator 26, and returns to the battery 24.

In the vehicle configuration 12 according to the exemplary embodiment described above, the floor panel 16 is a structure that includes the low-level portion 16A, the high-level portion 16B and the vertical wall portion 16C. The battery 24 is mounted below the low-level portion 16A and the motor 18 is mounted below the high-level portion 16B. Therefore, the motor 18 and the battery 24 may be mounted in the vehicle 14 to make effective use of space below the floor panel 16.

The vehicle configuration 12 according to the exemplary embodiment described above is a structure in which the motor 18 drives the rear wheels 22 and the motor 18 is disposed in a vicinity of the rear wheels 22. The radiator 26 and the air-blowing fan 38 may be disposed to make effective use of space between the motor 18 and the battery 24.

In the vehicle configuration 12 according to the exemplary embodiment described above, the battery mounted in the vehicle 14 is not limited provided it is a battery that is capable of supplying electric power to drive the motor 18. If a rechargeable battery is used, it may be used repeatedly by being recharged. Alternatively, a fuel cell that produces electric power by a chemical reaction of the fuel may be used.

All references, patent applications and technical specifications cited in the present specification are incorporated by reference into the present specification to the same extent as if the individual references, patent applications and technical specifications were specifically and individually recited as being incorporated by reference.

What is claimed is:

1. A vehicle configuration comprising:
   a motor that drives a wheel of a vehicle;
   a battery that supplies electric power to the motor;
   a floor panel including a low-level portion that is at a relatively low position in a vehicle vertical direction, a high-level portion that is at a rear of the vehicle relative to the low-level portion and is at a higher position than the low-level portion, and a vertical wall portion that connects between the low-level portion and the high-level portion;
   a cooling unit equipped with a radiator that is disposed at a lower side of the floor panel, heat from at least one of the motor and the battery being transferred to the radiator by circulation of a coolant;
   an air conditioning unit that supplies cool air to an interior of a cabin of the vehicle; and
   an air-blowing unit that includes an opening formed in the vertical wall portion through which air in the cabin can pass toward the radiator and an air-blowing fan that causes air in the cabin to pass through the opening and moves the air to the radiator, the air-blowing unit moving air in the cabin to the radiator.

2. The vehicle configuration according to claim 1, wherein the cooling unit includes:
   a first channel through which the coolant is circulated between the motor and the radiator; and
   a second channel through which the coolant is circulated between the battery and the radiator.

3. The vehicle configuration according to claim 2, further comprising a switching device that switches such that a flow path of the coolant is either one or both of the first channel and the second channel.

4. The vehicle configuration according to claim 3, wherein the switching device includes:
   a first pump provided at the first channel;
   a second pump provided at the second channel; and
   a control unit that controls the first pump and the second pump.

5. The vehicle configuration according to claim 1, wherein a blowing-out aperture is formed in the cabin of the vehicle, the blowing-out aperture blowing out air from the air conditioning unit toward the rear of the vehicle.

6. The vehicle configuration according to claim 5, wherein
   the battery is disposed below the low-level portion,
   the motor is disposed below the high-level portion, and
   the radiator and the air-blowing fan are disposed to the rear of the vertical wall portion.

7. The vehicle configuration according to claim 1, wherein
   the air-blowing fan is attached to the radiator, and
   the battery, the radiator and the motor are mounted to a frame member and made integral.

\* \* \* \* \*